United States Patent
Powers et al.

(10) Patent No.: US 7,839,662 B2
(45) Date of Patent: Nov. 23, 2010

(54) POWER SUPPLY HAVING A FLYBACK TOPOLOGY AND CURRENT SENSE TRANSFORMER

(75) Inventors: Randall L. Powers, Raleigh, NC (US); Christopher Tad Ammann, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1321 days.

(21) Appl. No.: 10/945,055

(22) Filed: Sep. 20, 2004

(65) Prior Publication Data

US 2006/0062028 A1 Mar. 23, 2006

(51) Int. Cl.
*H02M 3/335* (2006.01)
(52) U.S. Cl. .............. 363/21.12; 363/21.15; 363/21.17; 363/21.18
(58) Field of Classification Search ............ 363/13, 363/14, 15, 16, 17, 21.17, 21.07, 65, 21.12, 363/21.15, 95, 97, 21.18; 323/355; 725/68, 725/105, 143; 340/310.7
See application file for complete search history.

(56) References Cited

U.S. PATENT DOCUMENTS

| | | | | |
|---|---|---|---|---|
| 4,272,806 A | * | 6/1981 | Metzger | 363/21.17 |
| 4,754,385 A | * | 6/1988 | McDade et al. | 363/16 |
| 4,835,669 A | * | 5/1989 | Hancock et al. | 363/21.17 |
| 5,420,777 A | * | 5/1995 | Muto | 363/21.17 |
| 5,939,871 A | * | 8/1999 | Tanaka | 323/285 |
| 6,058,030 A | * | 5/2000 | Hawkes et al. | 363/65 |
| 6,366,066 B1 | * | 4/2002 | Wilcox | 323/282 |
| 6,385,061 B1 | * | 5/2002 | Turchi et al. | 363/21.15 |
| 6,462,965 B1 | * | 10/2002 | Uesono | 363/21.14 |
| 6,987,676 B2 | * | 1/2006 | Cheng et al. | 363/21.12 |
| 6,998,964 B2 | * | 2/2006 | Lomax et al. | 340/310.11 |
| 2003/0035306 A1 | * | 2/2003 | Matsumoto | 363/21.01 |
| 2003/0048648 A1 | * | 3/2003 | Lin et al. | 363/65 |
| 2005/0206358 A1 | * | 9/2005 | Van Der Horn et al. | 323/282 |

* cited by examiner

*Primary Examiner*—Bao Q Vu
*Assistant Examiner*—Nguyen Tran
(74) *Attorney, Agent, or Firm*—Fogg & Powers LLC

(57) ABSTRACT

A power supply having a flyback topology includes a flyback transformer and a current sense circuit that outputs a current signal indicative of a current output by the power supply. The current sense circuit includes a current sense transformer coupled to the flyback transformer.

10 Claims, 2 Drawing Sheets

POWER SUPPLY HAVING A FLYBACK TOPOLOGY AND CURRENT SENSE TRANSFORMER

TECHNICAL FIELD

The following description relates to power supplies in general and to power supplies having a flyback topology in particular.

BACKGROUND

One type of power supply topology is a flyback topology. Typically, a power supply that uses a flyback topology includes a flyback transformer and a switching device. When the switching device is turned on, a voltage is applied to the primary winding of the flyback transformer. When the switching device is turned off, the secondary winding of the flyback transformer conducts energy through a rectifier diode into an output capacitor where the energy is stored.

Power supplies often incorporate a current limiting function that is used to limit the amount of current output by such power supplies. Typically, a current sensing device is used to determine the amount of current output by a power supply at a given point in time. The operation of the power supply can then be adjusted based on the sensed output current, if appropriate.

Power supplies that use a flyback topology typically include a current sensing resistor in series with the secondary winding of the flyback transformer to sense the amount of current output by the power supply. Because this current sensing resistor is in series with the secondary winding of the flyback transformer, the current sensing resistor carries a high amount of current and dissipates a large amount of heat. As a result, the current sensing resistor is typically physically large and relatively costly.

SUMMARY

In one embodiment, an apparatus includes a power supply. The power supply has a flyback topology that comprises a flyback transformer and a current sense circuit that outputs a current signal indicative of a current output by the power supply. The current sense circuit comprises a current sense transformer coupled to the flyback transformer.

In another embodiment, a power supply comprises a flyback transformer having a primary winding and a secondary winding and a switch coupled to the primary winding of the flyback transformer. The switch enables input current to flow through the primary winding of the flyback transformer when the switch is turned on and wherein the switch prevents the current from flowing through the primary winding of the flyback transformer when the switch is turned off. The power supply further comprises a current sense transformer coupled to the secondary winding of the flyback winding. The current sense transformer is used to generate a current signal indicative of a current output by the power supply. The current signal is used to control the switch.

In another embodiment, a network element comprises a transceiver that sends and receives data over a communication medium and a power supply having a flyback topology comprising a flyback transformer and a current sense circuit that outputs a current signal indicative of a current output by the power supply. The current sense circuit comprises a current sense transformer coupled to the flyback transformer.

In another embodiment, a central office power plug comprises a power supply having a flyback topology comprising a flyback transformer and a current sense circuit that outputs a current signal indicative of a current output by the power supply. The current sense circuit comprises a current sense transformer coupled to the flyback transformer. The central office power plug further comprises a splitter coupled to the power supply. When the central office power plug is coupled to a sink network element using a communication medium, the splitter combines data intended for the sink network element and line power output by the power supply in order to generate a combined signal. The combined signal is applied to the communication medium to line power the sink network element.

In another embodiment, a system comprises a source network element and a sink network element coupled to the source network element. The source network element comprises a source power supply having a flyback topology comprising a flyback transformer and a current sense circuit that outputs a current signal indicative of a current output by the power supply. The current sense circuit comprises a current sense transformer coupled to the flyback transformer. The source network element combines data intended for the sink network element and line power output by the source power supply in order to generate a combined signal. The source network element applies the combined signal to the communication medium. The sink network element comprises a sink power supply that extracts the line power from the communication medium to power the sink network element.

The details of various embodiments of the claimed invention are set forth in the accompanying drawings and the description below. Other features and advantages will become apparent from the description, the drawings, and the claims.

DRAWINGS

DETAILED DESCRIPTION

Figure 1:
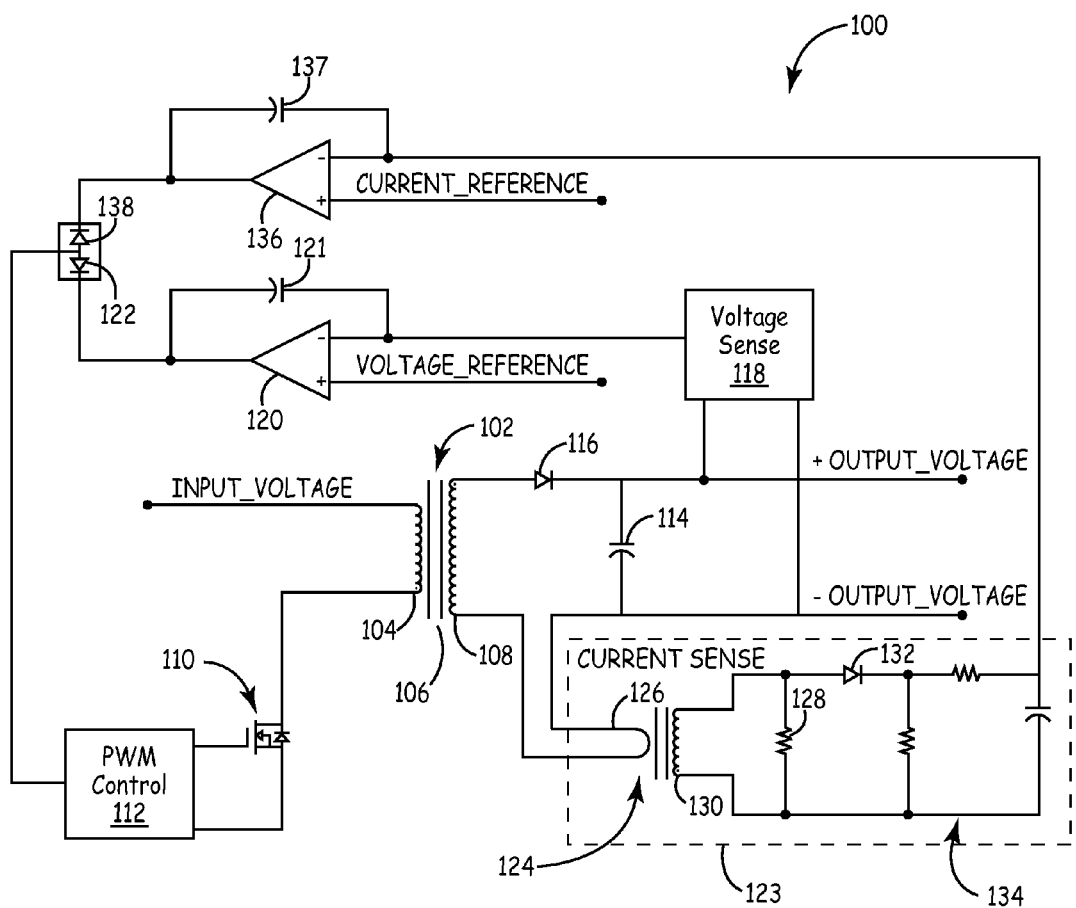
FIG. 1 is a circuit diagram of one embodiment of a power supply having a flyback topology and a current sense transformer.

FIG. 1 is a circuit diagram of one embodiment of a power supply 100 having a flyback topology. In the embodiment shown in FIG. 1, power supply 100 includes a flyback transformer 102. The flyback transformer 102 includes a primary winding 104, a core 106, and a secondary winding 108. The input voltage is applied across the primary winding 104 of the flyback transformer 102 when the switch 110 closes. In the particular embodiment shown in FIG. 1, the switch 110 is implemented using a power metal oxide semiconductor field-effect transistor (MOSFET). The power supply 100 includes a pulse width modulation (PWM) controller 112 that is used to turn the switch 110 on and off in order to allow the input current to flow through the primary winding 104 of the flyback transformer 102. The PWM controller 112 turns the switch 110 on and off in order to control the output voltage and output current generated by the power supply 100. The duty cycle of the PWM controller 112 is increased in order to increase the voltage output by the power supply 100 and decreased in order to decrease the voltage output by the power supply 100.

An output capacitor 114 is connected across the secondary winding 108 of the flyback transformer 102 using a flyback diode 116. When the PWM controller 112 turns the switch 110 on, the flyback diode 116 is not conducting and energy is stored in the core 106 of the flyback transformer 102. When the PWM controller 112 turns the switch 110 off (thereby stopping the input current from flowing through the primary winding 104), the flyback diode 116 turns on and the energy stored in the core 106 of the flyback transformer 102 charges the output capacitor 114 and provides load current. During the diode off time load current is supplied exclusively by the capacitor 114. The output voltage of the power supply 100 is taken across the capacitor 114, as shown in FIG. 1.

The power supply 100 includes a voltage sense circuit 118 that generates information indicative of the output voltage of the power supply 100. In the embodiment shown in FIG. 1, the voltage sensor circuit 118 outputs a voltage that is indicative of the output voltage of the power supply 100, which is applied to an input of an operational amplifier 120 (also referred to here as the "voltage control error operational amplifier" 120). A voltage reference signal is applied to a second input of the voltage control error operational amplifier 120. The voltage of the voltage reference signal corresponds to a nominal output voltage for the power supply 100. The voltage control error operational amplifier 120 outputs a signal that is indicative of the difference between the voltages applied to the two inputs of the operational amplifier 120. In the particular embodiment shown in FIG. 1, the voltage of the operational amplifier output is negative if the voltage output by the voltage sense circuit 118 is greater than the voltage reference input. The output of the voltage control error operational amplifier 120 is used by the PWM controller 112 (when the output current of the power supply 100 is less than the maximum output current of the power supply 100) to regulate the output voltage of the power supply 100 to achieve the nominal output voltage represented by the voltage reference signal. In the particular embodiment shown in FIG. 1, the output of the voltage control error operational amplifier 120 is coupled to the PWM controller 112 using a diode 122 that turns on and conducts when the output of the voltage control error operational amplifier 120 is negative. In the embodiment shown in FIG. 1, a filter capacitor 121 is coupled between the inverting input of the operational amplifier 121 and the output of the operational amplifier 121 to provide control stability.

The power supply 100 also comprises a current sense circuit 123 that includes a current sense transformer 124. A primary winding 126 of the current sense transformer 124 is in series between the secondary winding 108 of the flyback transformer 102 and the output capacitor 114. A sense resistor 128 is coupled across a secondary winding 130 of the current sense transformer 124. The current that flows through the primary winding 126 of the current sense transformer 124 induces a current in the secondary winding 130 that is proportional to the current flowing in the primary winding 126 of the current sense transformer 124. In this way the current sense transformer 124 captures the current that flows through the secondary winding 108 of the flyback transformer 102. The current flowing in the secondary winding 130 of the current sense transformer 124 generates a voltage across the sense resistor 128. A rectifier diode 132 allows the current sense transformer 124 to reset (allow the magnetic field to return to zero) without distorting the voltage across the sense resistor 128. An RC circuit 134 averages the rectified current output by the rectifier diode 132. A DC voltage is developed across the RC circuit 134 that is a scaled average of the current output by the power supply 100.

The DC voltage developed across the RC circuit 134 is applied to an input of an operational amplifier 136 (also referred to here as the "current control error operational amplifier" 136). A current reference signal is applied to a second input of the current control error operational amplifier 136. The voltage of the current reference signal corresponds to a maximum output current for the power supply 100. The current control error operational amplifier 136 outputs a signal that is indicative of the difference between the voltages applied to the two inputs of the current control error operational amplifier 136. In the particular embodiment shown in FIG. 1, the voltage of the operational amplifier output is negative if the output voltage of the RC circuit 134 is greater than the current reference signal. The output of the current control error operational amplifier 136 is used by the PWM controller 112 to control the power supply 110. In the embodiment shown in FIG. 1, the output of the current control error operational amplifier 136 is used to reduce the output voltage of the power supply 100 so that the output current of the power supply 100 is less than or equal to the maximum current of the power supply 100. In the particular embodiment shown in FIG. 1, the output of the current control error operational amplifier 136 is coupled to the PWM controller 112 using a diode 138 that turns on and conducts when the output of the current control error operational amplifier 136 is negative. In the embodiment shown in FIG. 1, a filter capacitor 137 is coupled between the inverting input of the operational amplifier 137 and the output of the operational amplifier 137 for control stability.

In the embodiment shown in FIG. 1, the diodes 122 and 138 logically "OR" the outputs of the voltage control error and current control error operational amplifiers 120 and 136. When either of the diodes 122 or 138 turn on, an input voltage is applied to the PWM controller 112, which causes the PWM controller 112 to reduce the output voltage of the power supply 100. When the output current of the power supply 100 is less than the maximum current for the power supply 100 (represented by the current reference signal), the output of the voltage control error operational amplifier 120 is used by the PWM controller 112 to regulate the power supply 100 so that the power supply 100 outputs the nominal voltage represented by the voltage reference signal. In this implementation, the output of the voltage control error operational amplifier 120 has a negative voltage when the output voltage of the power supply 100 is greater than the nominal voltage, which causes the diode 122 to turn on and apply an input voltage to the PWM controller 112. The output of the current control error operational amplifier 136 is used by the PWM controller 112 to reduce the output voltage of the power supply 100 when the output current of the power supply 100 is greater than the maximum current (represented by the current reference signal). By reducing the output voltage of the power supply 100, the output current of the power supply 100 is reduced. In this implementation, the output of the current control error operational amplifier 136 has a negative voltage when the output current of the power supply 100 is greater than the maximum current, which causes the diode 138 to turn on and apply an input voltage to the PWM controller 112.

By using a current sense transformer 124 in a power supply 100 having a flyback topology, the output current of the power supply 100 can be measured by a component that is isolated from the output of the power supply 100. A current sense resistor (which is typically physically large) need not be placed in series with the secondary winding 108 of the flyback transformer 102, which also obviates the need to dissipate the relatively large amount heat generated by such a resistor.

The various components of the power supply 100 can be implemented using appropriate discrete components and/or with components that integrate various components of the power supply 100. For example, in one implementation, the PWM controller 112 and the switch 110 are implemented in a single integrated circuit device.

Figure 2:
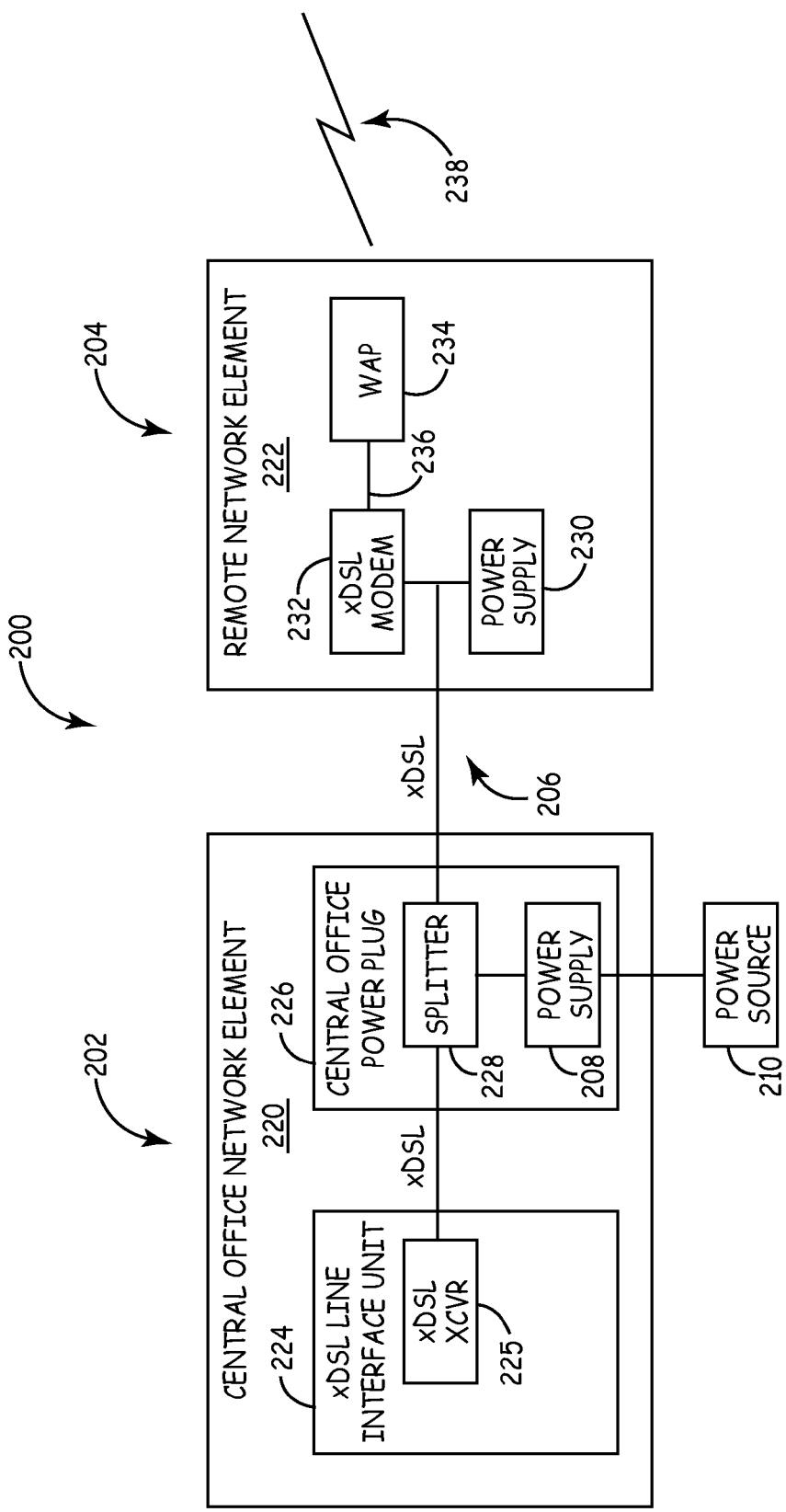
FIG. 2 is a block diagram of one embodiment of a network that includes at least one line-powered network element.

Embodiments of a power supply having a flyback topology and a current sense transformer can be used in various devices and systems. One exemplary embodiment is shown in FIG. 2. FIG. 2 is a block diagram of one embodiment of a network 200 that includes at least one line-powered network element. Network 200 includes at least one network element 202 (referred to here as a "source network element") that provides power to at least one other network element 204 (referred to here as a "sink network element") over a communication medium 206 (also referred to here as the "communication medium"). In one implementation, the communication medium 206 is also used to establish a communication link (for example, a digital subscriber line (DSL) communication link) between the source network element 202 and the sink network element 204. In other implementations, a communication medium (or media) other than the communication medium used for line powering is used to establish one or more communication links between the source network element 202 and the sink network element 204.

In such an embodiment, the source network element 202 comprises a power supply 208 having a flyback topology and a current sense transformer. In one implementation of such an embodiment, the power supply 208 comprises an embodiment of the power supply 100 shown FIG. 1. The power supply 208 is coupled to a power source 210 that provides the input voltage for the power supply 208. In one implementation, the power source 210 includes a direct current (DC) and/or an alternating current (AC) power source such as a battery and/or a connection to the main power grid. Power output by the power supply 208 is applied to the communication medium 206 through a splitter 228. The sink network element 204 extracts the line power from the communication medium 206 and uses the extracted line power to power the sink network element 204.

In the particular embodiment shown in FIG. 2, the source network element 202 comprises a central office network element 220 located in a central office of a service provider and the sink network element 204 comprises a remote network element 222 located in the outside plant, for example, in an environmentally hardened enclosure. In such an embodiment, a DSL link is provided between the central office network element 220 and the remote network element 222 over the communication medium 206. The DSL link is provided over same communication medium that line power is provided to the remote network element 222. The reference "xDSL" is also used herein to refer any suitable DSL link (or related technology). Examples of suitable xDSL links include a DSL link conforming to the International Telecommunication Union (ITU) standard G.991.2 (a "G.SHDSL" link), a high-bit rate DSL (HDSL) link, a high-bit rate digital subscriber line 2 (HDSL2) link, a high-bit rate digital subscriber line 4 (HDSL4) link, or an asymmetric digital subscriber line (ADSL) link). In other embodiments, other types of communication links are used.

The central office network element 220, in the configuration shown in FIG. 2, comprises an xDSL line interface unit 224 that terminates the xDSL link provided between the central office network element 220 and the remote network element 222. In one implementation of such an embodiment, the xDSL line interface unit 224 is inserted into a subscriber access multiplexer (not shown) that couples the xDSL line interface unit 224 to one or more upstream networks such as the Internet and/or a public switched telephone network (PSTN). The xDSL line interface unit 224 includes appropriate components for formatting, sending, and receiving data with the one or more upstream networks and formatting, sending, and receiving data with the remote network element 222. For example, the xDSL line interface unit 224 includes a xDSL transceiver 225 that sends and receives xDSL data to and from the remote network element 222 over the communication medium 206.

In the particular embodiment shown in FIG. 2, the central office network element 220 further comprises a central office power plug 226. The central office power plug 226 includes the power supply 208 having a flyback topology and a current sense transformer. The power supply 208 of the central office power plug 226 is coupled to the power source 210. The central office power plug 226 further comprises a splitter 228 that, in the downstream direction (that is, from the central office power plug 226 to the remote network element 222), receives xDSL traffic intended for the remote network element 222 from the xDSL line interface unit 224, combines the received xDSL traffic with line power output by the power supply 208, and outputs the combined signal onto the communication medium 206. In the upstream direction (that is, from the remote network element 222 to the central office power plug 226), the splitter 228 receives from the communication medium 206 xDSL traffic transmitted by the remote network element 222 and outputs the received xDSL traffic to the xDSL line interface unit 224 for processing thereby.

The remote network element 222 is powered by the communication medium 206 that is coupled between the central office power plug 226 and the remote network element 222. The remote network element 222 includes a power supply 230 that is coupled to the communication medium 206. The power supply 230 extracts the power supplied on the communication medium 206 by the central office power plug 226. The extracted power is used to power the various components of the remote network element 222.

The remote network element 222 also includes an xDSL modem 232 that modulates and demodulates the xDSL signals carried over the communication medium 206. The modem 232 is coupled to a wireless access point 234 over an ETHERNET connection 236. The wireless access point 234 transmits traffic to, and receives traffic from, various wireless devices (not shown) over at least one wireless link 238. Examples of wireless devices include computers or personal digital assistants having wireless transceivers. In one embodiment, the wireless access point 234 is a wireless access point that supports the Institute for Electrical and Electronics Engineers (IEEE) 802.11b standard (also referred to as "WI-FI"), 802.11a, 802.11g, HomeRF, or any other appropriate wireless communication standard. In other embodiments, a remote network element 222 includes an external ETHERNET port (in addition to or instead of the wireless access point 234) that could be used to couple the subscriber interface of the xDSL modem 232 to a local area network over a wired connection.

In operation, wireless traffic is received by the wireless access point 234 from various wireless devices. The wireless traffic is transmitted to the central office network element 220 by the xDSL modem 232 over the communication medium 206. The splitter 228 receives the xDSL traffic transmitted by the modem 232 and provides the received traffic to the xDSL line interface unit 224 for appropriate processing thereby. The xDSL line interface 224 processes the xDSL traffic received from the remote network element 222 and forwards the traffic, if appropriate, to an appropriate upstream network. In the downstream direction, traffic intended for the remote network element 222 is received by the xDSL line interface unit 224 from an upstream network. The xDSL line interface unit 224 formats and transmits the received traffic on the xDSL link. The central office power plug 226 receives the xDSL traffic from the xDSL line interface unit 224, combines the received xDSL traffic with the line power output by the power supply 208 of the central office power plug 226, and outputs the combined signal onto the communication medium 206. The remote network element 222 receives the combined signal from the communication medium 206. The power supply 230 of the remote network element 222 extracts the power supplied on the communication medium 206 for powering the remote network element 222. The xDSL modem 232 of the remote network element 222 extracts the traffic from the communication medium 206 and outputs the traffic to the wireless access point 234 over the ETHERNET connection 236. The wireless access point 234 transmits the traffic over the wireless communication link 238 to appropriate wireless devices.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. Apparatus comprising:
a power supply having a flyback topology that comprises a flyback transformer and a current sense circuit that outputs a current signal indicative of a current output by the power supply;
wherein the current sense circuit comprises a current sense transformer coupled to the flyback transformer;
wherein the current signal is used to control the power output by the power supply; and
wherein the current signal is used to reduce a voltage output by the power supply when the current signal indicates that the current output by the power supply is greater than a maximum current for the power supply.

2. A power supply comprising:
a flyback transformer having a primary winding and a secondary winding;
a switch coupled to the primary winding of the flyback transformer, wherein the switch enables input current to flow through the primary winding of the flyback transformer when the switch is turned on and wherein the switch prevents the current from flowing through the primary winding of the flyback transformer when the switch is turned off;
a current sense transformer coupled to the secondary winding of the flyback winding, wherein the current sense transformer is used to generate a current signal indicative of a current output by the power supply; and
an operational amplifier having a first input coupled to the current signal and a second input coupled to a current reference signal indicative of a maximum current for the power supply;
wherein the current signal is used to control the switch.

3. The power supply of claim 2, further comprising a controller that uses the current signal to control the switch.

4. The power supply of claim 3, wherein the controller comprises a pulse width modulation controller that turns the switch on and off based on the current signal.

5. The power supply of claim 2, further comprising a voltage sense circuit that outputs a voltage signal indicative of a voltage output by the power supply.

6. The power supply of claim 5, wherein the voltage signal is used to control the switch.

7. The power supply of claim 6, further comprising an operational amplifier having a first input coupled to the voltage signal and a second input coupled to a voltage reference signal indicative of a nominal voltage for the power supply.

8. The power supply of claim 2, further comprising a flyback rectifier diode coupled to the secondary winding of the flyback transformer, wherein the rectifier diode rectifies the current flowing in the secondary winding of the flyback transformer.

9. The power supply of claim 2, further comprising an output capacitor coupled across the secondary winding of the flyback transformer.

10. The power supply of claim 2, further comprising an current sense circuit that outputs the current signal, wherein the current sense circuit includes the current sense transformer and an RC circuit that averages a current flowing in a secondary winding of the current sense transformer.

* * * * *